United States Patent
Liu et al.

(10) Patent No.: US 10,104,664 B2
(45) Date of Patent: Oct. 16, 2018

(54) ENHANCED CHANNEL CONTENTION SCHEMES FOR HIGH-EFFICIENCY WLAN

(71) Applicant: MEDIATEK INC., Hsinchu (TW)

(72) Inventors: Jianhan Liu, San Jose, CA (US);
RongSheng Huang, Fremont, CA (US);
Li Ma, Sunnyvale, CA (US);
Chao-Chun Wang, Taipei (TW)

(73) Assignee: MEDIATEK INC., HsinChu (TW)

( * ) Notice: Subject to any disclaimer, the term of this patent is extended or adjusted under 35 U.S.C. 154(b) by 124 days.

(21) Appl. No.: 15/181,354

(22) Filed: Jun. 13, 2016

(65) Prior Publication Data

US 2016/0374087 A1 Dec. 22, 2016

Related U.S. Application Data

(60) Provisional application No. 62/180,200, filed on Jun. 16, 2015, provisional application No. 62/181,408, filed on Jun. 18, 2015.

(51) Int. Cl.
*H04W 72/04* (2009.01)
*H04W 74/08* (2009.01)
(Continued)

(52) U.S. Cl.
CPC ....... *H04W 72/0453* (2013.01); *H04L 5/0007* (2013.01); *H04L 27/2605* (2013.01);
(Continued)

(58) Field of Classification Search
CPC ............. H04W 72/0453; H04L 5/0007; H04L 27/2605
See application file for complete search history.

(56) References Cited

U.S. PATENT DOCUMENTS

2014/0328270 A1  11/2014 Zhu et al. ............ 370/329
2015/0296528 A1*  10/2015 Coffey ............... H04L 1/0021
                                                          370/338
(Continued)

FOREIGN PATENT DOCUMENTS

WO  WO2014209919 A1  12/2014
WO  WO2016023492 A1  2/2016

OTHER PUBLICATIONS

EPO, Search Report for the EP patent application 16174619.3 dated Oct. 31, 2016 (10 pages).

(Continued)

*Primary Examiner* — Jamal Javaid
(74) *Attorney, Agent, or Firm* — Imperium Patent Works; Zheng Jin

(57) ABSTRACT

A unified channel contention scheme is proposed such that spatial reuse can be enabled by a wireless station (STA) when a basic service set (BSS) color of a received signal cannot be resolved. If the detected frame is an intra-BSS frame, then the STA should not contend the channel for the PPDU duration. If the detected frame is an inter-BSS frame, then the STA uses OBSS Packet Detection (OBSS-PD) level as the CCA level for channel contention. Furthermore, when BSS color cannot be resolved, channel contention schemes for WiFi signal and non-WiFi signal are differentiated. If the received signal is detected as WiFi signal, then the STA uses WiFi-SIG Detection (WD) level as the CCA level for channel contention. If the received signal is detected as non-WiFi signal, then the STA uses Non-WiFi-SIG Detection (NWD) level as the CCA level for channel contention.

20 Claims, 5 Drawing Sheets

(51) Int. Cl.
*H04L 5/00* (2006.01)
*H04L 27/26* (2006.01)
*H04W 16/14* (2009.01)
*H04W 84/12* (2009.01)
*H04W 88/02* (2009.01)

(52) U.S. Cl.
CPC ........ *H04W 74/0808* (2013.01); *H04W 16/14* (2013.01); *H04W 84/12* (2013.01); *H04W 88/02* (2013.01)

(56) References Cited

U.S. PATENT DOCUMENTS

| 2016/0050691 | A1 | 2/2016 | Jauh et al. | 370/252 |
| 2016/0157264 | A1 | 6/2016 | Wang et al. | 370/329 |

OTHER PUBLICATIONS

John Son et al., Further Considerations on Legacy Fairness with Enhanced CCA, IEEE 802.11-15/0374r1, Mar. 10, 2015 (9 pages).
John Son et al., Further Considerations on Enhanced CCA for 11 ax, IEEE 802.11-14/0847r0, Jul. 15, 2014 (12 pages).

\* cited by examiner

SIGNAL DETECTION BASED ON WIFI SIGNAL FEATURES

SIGNAL DETECTION BASED ON LTE SIGNAL FEATURES

ENHANCED CHANNEL CONTENTION SCHEMES FOR HIGH-EFFICIENCY WLAN

CROSS REFERENCE TO RELATED APPLICATIONS

This application claims priority under 35 U.S.C. § 119 from U.S. Provisional Application No. 62/180,200, entitled "Enhanced Channel Contention Schemes for High-Efficiency WLAN," filed on Jun. 16, 2015; U.S. Provisional Application No. 62/181,408, entitled "Reliable Dual Sub-Carrier Modulation Schemes in High Efficiency WLAN," filed on Jun. 18, 2015, the subject matter of which is incorporated herein by reference.

TECHNICAL FIELD

The disclosed embodiments relate generally to wireless network communications, and, more particularly, to enhanced channel contention schemes in high-efficiency wireless local area networks (WLANs).

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

In IEEE 802.11ac WLAN systems, a transmitter of a BSS (basis service set) of certain bandwidth is allowed to transmit radio signals onto the shared wireless medium depending on clear channel assessment (CCA) sensing and a deferral or backoff procedure for channel access contention. An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The basic assumption of EDCA is that a packet collision can occur if a device transmits signal under the channel busy condition when the received signal level is higher than CCA level. This simple CSMA/CA with random back-off contention scheme and low cost ad hoc deployment in unlicensed spectrum have contributed rapid adoption of IEEE 802.11ac Wi-Fi systems.

Today, Wi-Fi devices are over-populated. Dense deployment has led to significant issues such as interference, congestion, and low throughput. Raising CCA levels has been shown to increase spatial reuse, which leads to significant increase in the network throughput in some dense deployment scenarios. In general, increasing CCA levels for inter-BSS packets can enhance the spatial reuse because more simultaneous transmissions can happen in multiple overlapping BSSs (OBSSs). However, raising CCA levels for spatial reuse also introduces more collision into the networks.

In IEEE 802.11ax WLAN systems, to enhance spatial reuse and avoid collisions, a BSS color is inserted into the signal field for each HE packet. When a station (STA) receives a HE packet, by resolving the BSS color, the STA might be able to identify that the packet is from OBSS (called inter-BSS) or from its own BSS (called intra-BSS). When spatial reuse is applied, channel contention schemes should be different for inter-BSS and intra-BSS packets. In a dense WLAN environment, however, BSS color is not always resolvable for a given STA because the received packet can be the superposition of multiple packets. A solution is sought to enhance the channel contention scheme such that spatial reuse can be enabled when BSS color cannot be resolved.

SUMMARY

Enhanced channel contention schemes for primary channels and secondary channels for high efficiency (HE) wireless local area network (WLAN) based on IEEE 802.11ax standards are proposed. Multiple clear channel assessment (CCA) levels are proposed for primary channel CCA based on packet detection and signal detection of the received signal. A unified channel contention scheme is proposed such that spatial reuse can be enabled by a wireless station (STA) when a basic service set (BSS) color of the received signal cannot be resolved. If the detected frame is an intra-BSS frame, then the STA should not contend the channel for the PPDU duration. If the detected frame is an inter-BSS frame, then the STA uses OBSS Packet Detection (OBSS-PD) level as the CCA level for channel contention. Furthermore, when BSS color cannot be resolved, channel contention schemes for WiFi signal and non-WiFi signal are differentiated. If the received signal is detected as WiFi signal, then the STA uses WiFi-SIG Detection (WD) level as the CCA level for channel contention. If the received signal is detected as non-WiFi signal, then the STA uses Non-WiFi-SIG Detection (NWD) level as the CCA level for channel contention.

In one embodiment, a wireless station receives a radio signal over a wireless channel in a wireless local area network (WLAN). The radio signal carries a data packet. The wireless station determines whether the data packet has an intra-BSS packet type or an inter-BSS packet type by resolving a BSS color of the data packet. The wireless station detects whether the radio signal has a WiFi radio signal type or a non-WiFi signal type if the BSS color cannot be resolved. Finally, the wireless station performs a channel contention scheme to gain access to the wireless channel. The channel contention scheme applies a clear channel assessment (CAA) level that is determined based on the decoded packet type and the detected radio signal type.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
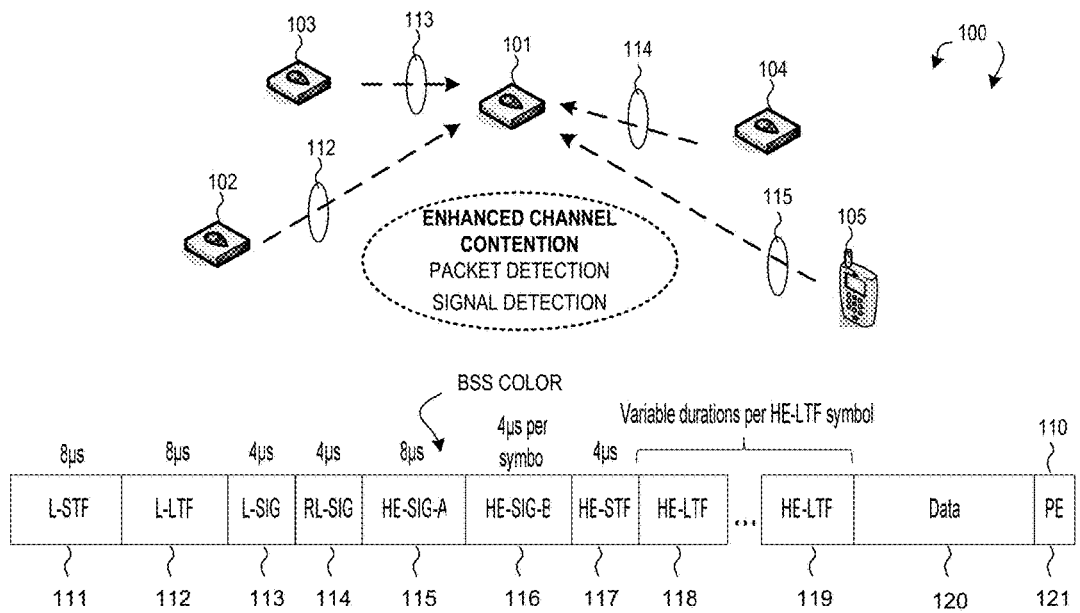
FIG. 1 illustrates a wireless communications system with enhanced channel contention scheme for high efficiency (HE) WLAN in accordance with a novel aspect of the current invention.

FIG. 1 illustrates a wireless communications network 100 with enhanced channel contention scheme for high efficiency (HE) WLAN in accordance with a novel aspect of the current invention. Wireless communications network 100 comprises wireless devices 101-104. An enhanced distributed channel access protocol (EDCA) is applied by wireless station STA 101 as a channel contention procedure for STA 101 to gain access to the shared wireless medium, e.g., to obtain a transmitting opportunity (TXOP) for transmitting radio signals onto the shared wireless medium. The basic assumption of EDCA is that a packet collision can occur if a device transmits signal under the channel busy condition when the received signal level is higher than a clear channel assessment (CCA) level. Dense deployment has led to significant issues such as interference, congestion, and low throughput. Raising CCA levels has been shown to increase spatial reuse, which leads to significant increase in the network throughput in some dense deployment scenarios. In general, increasing CCA levels for inter-BSS packets can enhance the spatial reuse because more simultaneous transmissions can happen in multiple overlapping BSSs (OBSSs).

However, raising CCA levels also introduces more collision into the networks. In high-efficiency (HE) WLAN systems, to enhance spatial reuse and avoid collisions, a basic service set (BSS) color is inserted into the signal field for each HE packet. When a STA receives a HE packet, by resolving the BSS color, the STA might be able to identify that the packet is from OBSS (called inter-BSS) or from its own BSS (called intra-BSS). When spatial reuse is applied, channel contention schemes should be different for inter-BSS and intra-BSS packets. In a dense WLAN environment, however, BSS color is not always resolvable for a given STA because the received packet can be the superposition of multiple packets.

In accordance with one novel aspect, a unified channel contention scheme is proposed such that spatial reuse can be enabled when BSS color cannot be resolved. If the detected frame is an intra-BSS frame, then the STA should not contend the channel for the PPDU duration. If the detected frame is an inter-BSS frame, then the STA uses OBSS Packet Detection (OBSS-PD) level as the CCA level for channel contention. Furthermore, when BSS color cannot be resolved, channel contention schemes for WiFi signal and non-WiFi signal are differentiated. If the received signal is detected as WiFi signal, then the STA uses WiFi-SIG Detection (WD) level as the CCA level for channel contention. If the received signal is detected as non-WiFi signal, then the STA uses Non-WiFi-SIG Detection (NWD) level as the CCA level for channel contention.

In wireless communications systems, wireless devices communicate with each other through various well-defined frame structures. In general, a frame comprises a Physical Layer Convergence Procedure (PLCP) Protocol Data Unit (PPDU), a frame header, and a payload. Frames are in turn divided into very specific and standardized sections. FIG. 1 depicts a HE SU PPDU frame 110, which comprises a legacy short training field (L-STF 111), a legacy long training field (L-LTF 112), a legacy signal field (L-SIG 113), a repeat legacy signal field (RL-SIG 114), a HE signal A field (HE-SIG-A 115), a HE signal B field (HE-SIG-B 116), a HE short training field (HE-STF 117), a HE long training field for data (HE-LTF 118), HE-data payload 120, and a Packet Extension (PE) 121. In one example, HE-SIG-A filed 115 comprises a BSS color subfield. A BSS color is a shortened indication (e.g., a 6-bit indication) of BSS identifier (ID), which is chosen by an access point (AP) of the BSS based on its observation of BSS colors of overlapping neighbor BSSs.

In the example if FIG. 1, when STA 101 attempts to transmit radio signals onto the shared wireless medium, it applies EDCA for channel contention. First, STA 101 performs packet detection and tries to resolve the BSS color by decoding the HE-SIG-A field. Second, STA 101 performs radio signal detection and determines whether the received signal is WiFi signal or not. In a first example, STA 101 receives HE PPDU 112 from STA 102, and resolves the BSS color indicating it is an intra-BSS frame. STA 101 should not contend the channel for the PPDU duration. In a second example, STA 101 receives HE PPDU 113 from STA 103, and resolves the BSS color indicating it is an inter-BSS frame. STA 101 then applies OBSS-PD level as the CCA level for channel contention. In a third example, STA 101 receives HE PPDU 114 from STA 104, but cannot resolve the BSS color. STA 101 detects that the received signal is WiFi signal and thus applies WD level as the CCA level for channel contention. In a fourth example, STA 101 receives Long Term Evolution (LTE) radio signal from user equipment UE 105. STA 101 detects that the received signal is not WiFi signal and thus applies NWD level as the CCA level for channel contention. By applying different CCA levels based on detected packet and signal type, spatial reuse can be enhanced while avoiding collision.

Figure 2:
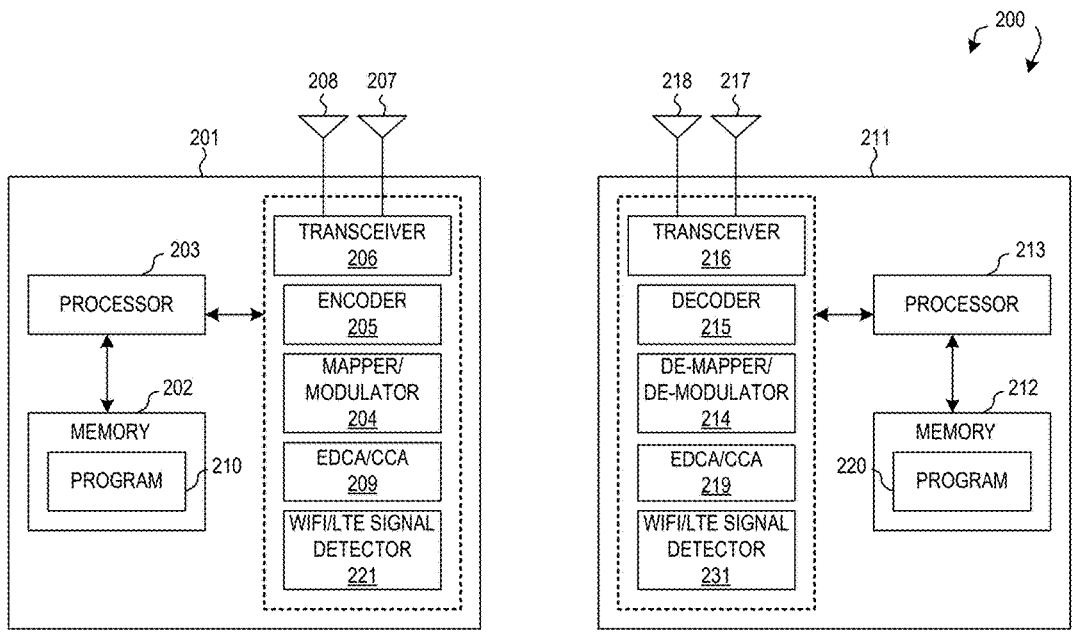
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, an EDCA/CCA module 209, and a WiFi/LTE signal detector 221. Wireless device 211 is a receiving device that includes a decoder 215, a symbol de-mapper/de-modulator 214, an EDCA/CCA module 219, and a WiFi/LTE signal detector 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220 in memory 202 and 212), allow transmitting device 201 and receiving device 211 to perform embodiments of the present invention.

In one example, at the transmitter side, device 201 generates a HE PPDU frame, and inserts BSS color subfield in a signal field of the HE PPDU frame. Device 201 then applies enhanced EDCA/CCA channel contention before transmitting the HE PPDU to the receiver. At the receiver side, device 211 receives the HE PPDU, and decodes the BSS color subfield. If the BSS color is resolvable, then device 211 applies different channel contention schemes depending on whether the received PPDU is from intra-BSS or from inter-BSS. On the other hand, if the BSS color is not resolvable, then the receiver detects whether the received signal is WiFi signal or non-WiFi signal and applies different channel contention schemes accordingly. Various embodiments of such transmitting device and receiving device and channel contention schemes are now described below with accompany drawings.

Figure 3:
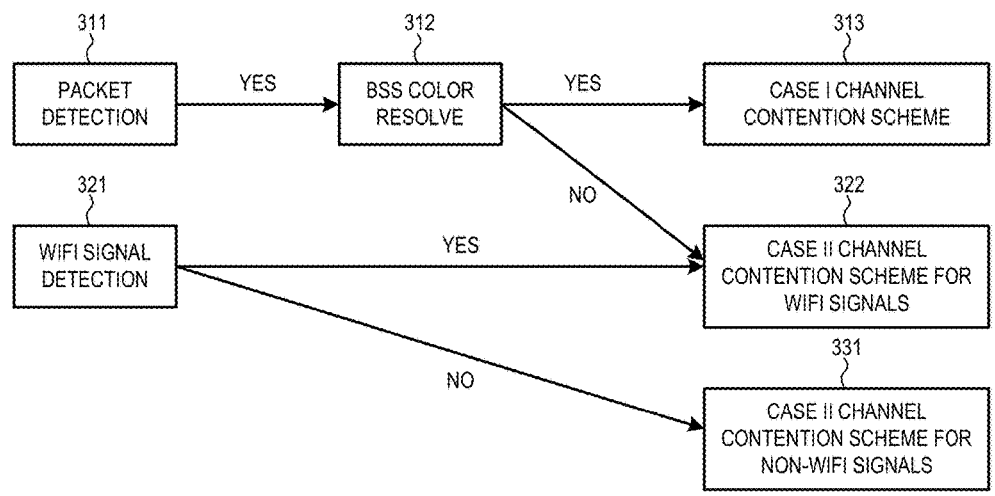
FIG. 3 illustrates unified channel contention schemes for HE WLAN in accordance with a novel aspect of the current invention.

FIG. 3 illustrates unified channel contention schemes for HE WLAN in accordance with a novel aspect of the current invention. For a wireless station trying to gain channel access for transmitting data onto the shared wireless medium, it will perform packet detection (step 311) and WiFi signal detection (step 321) before determining which channel contention scheme to apply. Channel contention schemes are considered under two different cases. Under case I, BSS color of the received packet can be correctly resolved. Under case II, BSS color of the received packet cannot be resolved. In step 311, the wireless station performs packet detection of a received radio signal. If a WiFi PPDU packet is successfully detected, then the wireless station goes to step 312 and tries to resolve the BSS color of the WiFi PPDU by decoding the PPDU SIG-A field in preamble processing. If the BSS color is resolvable, then the wireless station goes to step 313 and applies a case I channel contention scheme. If the BSS color is not resolvable, then the wireless station goes to step 322 and applies a case II channel contention scheme for WiFi signals. On the other hand, if the packet detection in step 311 is not successful, then the wireless device performs WiFi signal detection of the received radio signal in step 321. If the received radio signal is a WiFi radio signal, then the wireless device goes to step 322 and applies the case II channel contention scheme for WiFi signals. However, if the received radio signal is not a WiFi radio signal, then the wireless device goes to step 331 and applies a case II channel contention scheme for non-WiFi signals.

Figure 4:
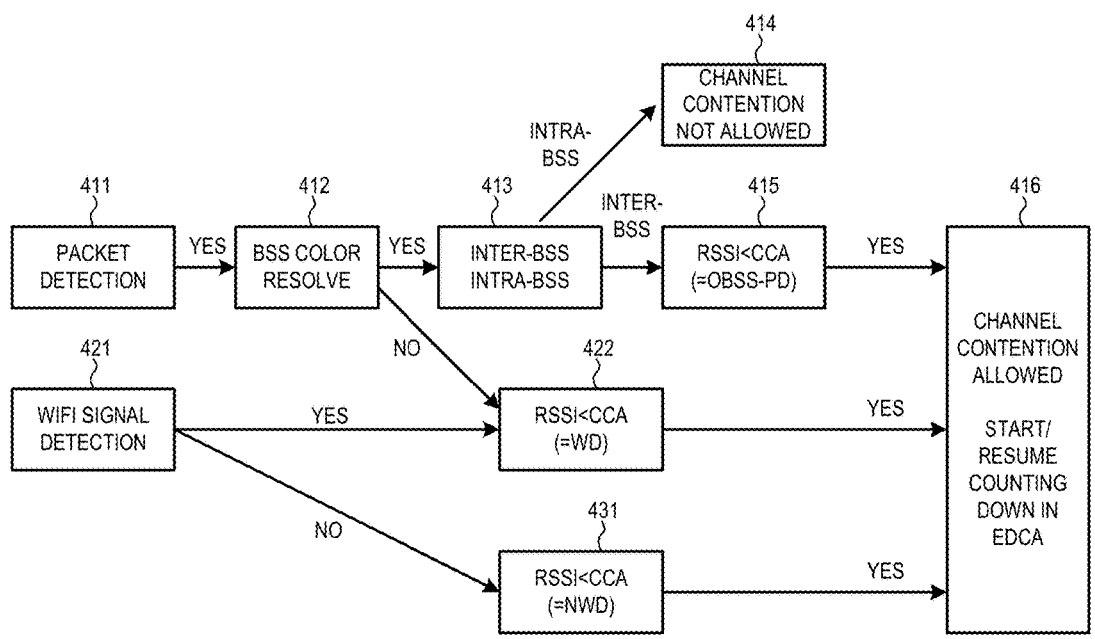
FIG. 4 illustrates one embodiment of an enhanced channel contention scheme for HE WLAN in accordance with a novel aspect of the current invention.

FIG. 4 illustrates one embodiment of an enhanced channel contention scheme for HE WLAN in accordance with a novel aspect of the current invention. In step 411, a wireless station (STA) performs packet detection of a received radio signal. If a WiFi PPDU packet is successfully detected, then the STA goes to step 412 and tries to resolve the BSS color of the WiFi PPDU by decoding the PPDU SIG-A field in preamble processing. If the BSS color is resolvable, then the STA goes to step 413 and applies a case I channel contention scheme. In the example of FIG. 4, for case I channel contention, in step 413, the STA determines whether the detected WiFi PPDU is an inter-BSS or intra-BSS frame by using the BSS color in SIG-A or MAC address in the MAC header. If the detected frame is an intra-BSS frame, then the STA should not contend the wireless channel for the PPDU duration (step 414). If the detected frame is an inter-BSS frame, then the STA uses OBSS Packet Detection (named OBSS-PD) level as the CCA level for channel contention.

The OBSS-PD level is greater than the minimum receiver sensitivity level used in WLAN. For example, the minimum receiver sensitivity level is −82 dBm for 20 MHz in WLAN based on IEEE 802.11a/b/g/n/ac standards. In one example, the OBSS-PD level can be −72 dBm for 20 MHz. In another example, the OBSS-PD level can be X dBm, and −62 dBm$>=$X$>=$−82 dBm. In yet another example, the OBSS-PD level can be multiple levels and each level corresponds to different channel contention probability. The channel contention probability can be controlled by different counting down speed or probability of able to contend in EDCA procedure. If the received signal strength indicator (RSSI) of the receive signal is lower than the OBSS-PD level, then the STA is allowed to contend for the wireless channel, e.g., be able to start/resume the counting down process defined in IEEE WLAN (step 416).

If the packet detection is unsuccessful, or if the BSS color is not resolvable, then the STA also checks if the received signal is a WiFi signal (step 421). If a WiFi PPDU packet is detected but BSS color is not resolved correctly in step 412, then the received signal is regarded as WiFi signal. Other WiFi signal detection methods are described with respect to FIG. 6 and FIG. 7. If the received signal is detected as WiFi signal but no BSS color can be resolved, then the STA applies a case II channel contention scheme for WiFi signal (step 422). In step 422, the STA uses WiFi-SIG Detection (named WD) level as the CCA level for channel contention. In one example, the WD level can be the same as the OBSS-PD level. In another example, the WD level can be a level between the minimum sensitivity level and the OBSS-PD level. In yet another example, the WD level can be multiple levels and each level corresponds to different channel contention probability. If the RSSI of the receive signal is lower than the WD level, then the STA is allowed to contend for the wireless channel, e.g., be able to start/resume the counting down process defined in IEEE WLAN (step 416).

If the received signal is detected as non-WiFi signal and no BSS color can be resolved, then the STA applies a case II channel contention scheme for non-WiFi signal (step 431). In step 431, the STA uses non-WiFi-SIG Detection (named NWD) level as the CCA level for channel contention. In a first example, the NWD level can be the same Energy Detection (ED) level, e.g., −62 dBm for WLAN based on IEEE 802.11a/b/g/n/ac standards. In a second example, the NWD level can be a level between the OBSS-PD level and the ED level. In a third example, the NWD level can be a level that is higher than the ED level. In a fourth example, the NWD level can also be multiple levels and each level correspond to different channel contention probability. The channel contention probability can be controlled by different counting down speed or probability of able to contend in EDCA procedure. If the RSSI of the receive signal is lower than the NWD level, then the STA is allowed to contend for the wireless channel, e.g., be able to start/resume the counting down process defined in IEEE WLAN (step 416).

In general, the different CCA levels for channel contention can be set as follows. In a first preferred embodiment, WD<=OBSS-PD<=NWD. For example, WD=−82 dBm, OBSS-PD=−72 dBM, and NWD=−62 dBm or higher. In this example, the CCA level is the lowest when the detected radio signal is a WiFi signal, a low CCA level is to avoid collision with the detected WiFi signal, because the detected WiFi signal can possibly be an intra-BSS frame. On the other hand, the CCA level is the highest when the detected radio signal is a non-WiFi signal, a high CCA level is to make sure that WiFi devices have increased chance in contending for channel access, even when non-WiFi signals are present. In a second preferred embodiment, OBSS-PD<=WD<=NWD. For example, OBSS-PD=−72 dB, WD=−67 dBm, and NWD=−62 dBm or higher. In this example, the CCA level is the lowest when the detected radio signal is from inter-BSS, such low CCA level is to increase spatial reuse among WiFi devices in neighboring OBSSs.

Figure 5:
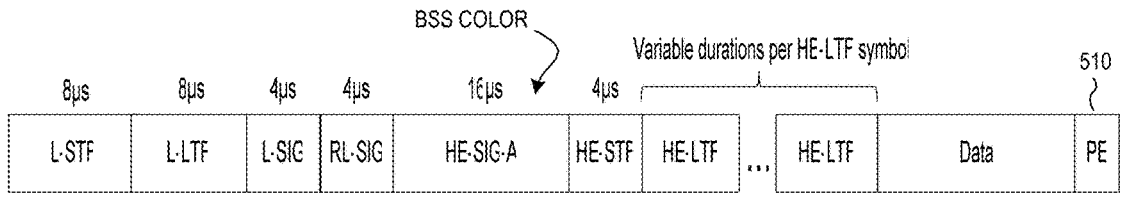
FIG. 5 shows different examples of HE PPDU formats and BSS color indication.
Figure 5:
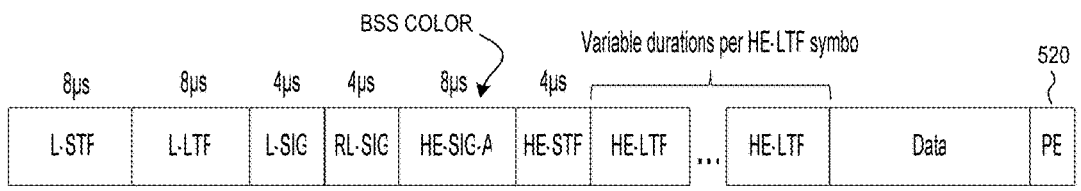
Figure 5:
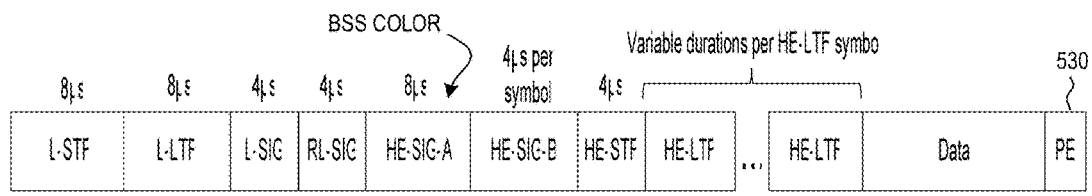
Figure 5:
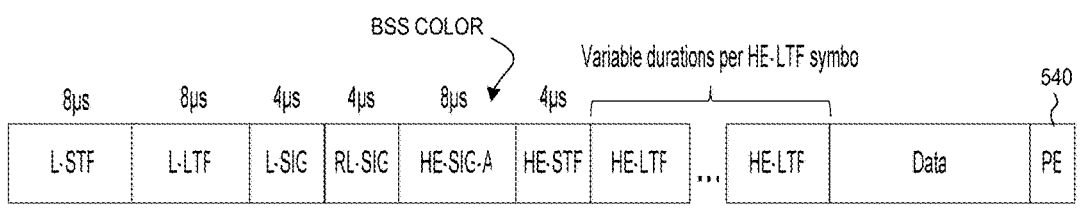

FIG. 5 shows different examples of HE PPDU formats and BSS color indication. HE PPDU 510 shows the HE extended range SU PPDU format with HE-SIG-A signal field carrying the BSS color subfield. HE PPDU 520 shows the HE SU PPDU format with HE-SIG-A signal field carrying the BSS color subfield. HE PPDU 530 shows the HE MU PPDU format with HE-SIG-A signal field carrying the BSS color subfield. HE PPDU 550 shows the HE trigger-based PPDU format with HE-SIG-A signal field carrying the BSS color subfield. The SIG-A field is typically encoded by lowest MCS for robust decoding. However, the BSS colors is not always resolvable for a given STA because the received packet can be the superposition of multiple packets.

Figure 6:
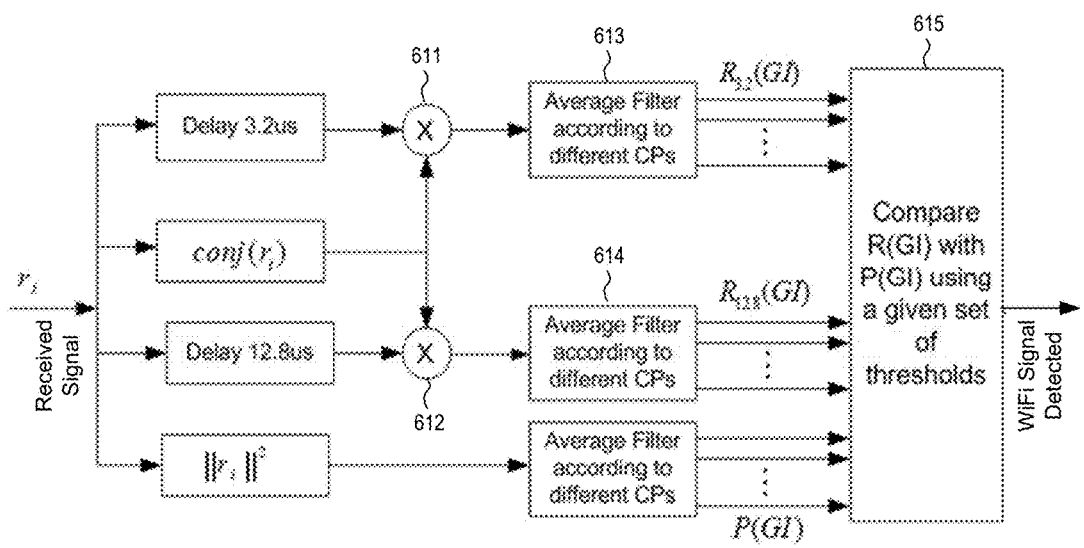
FIG. 6 illustrates one example of radio signal detection based on Wi-Fi signal features.

FIG. 6 illustrates one example of radio signal detection based on W-Fi signal features. Most popular Wi-Fi signals are OFDM modulated with a fixed set symbol durations and cyclic prefixes (CP). For example, Wi-Fi signals based on IEEE 802.11a/g/n/ac standards has symbol duration of 3.2 us and Wi-Fi signals based on the upcoming IEEE 802.11a/g/n/ac standards has symbol duration of 12.8 us. The CP lengths of Wi-Fi signals with 3.2 us symbol duration can be 0.8 us and 0.4 us. The CP lengths of Wi-Fi signals with 12.8 us symbol duration can be 0.8 us, 1.6 us and 3.2 us. FIG. 6 is an embodiment of Wi-Fi signal detection based on auto-correlations of CP signals. The received signal r is auto-correlated by correlators 611 and 612 for 3.2 us and 12.8 us symbol durations, respectively. The auto-correlation result then is averaged or filtered over multiple OFDM symbol durations plus CP length by average filters 613 and 614. By comparing the results R(GI) with measured power P(GI), the Wi-Fi signal can be detected by signal detector 615.

Figure 7:
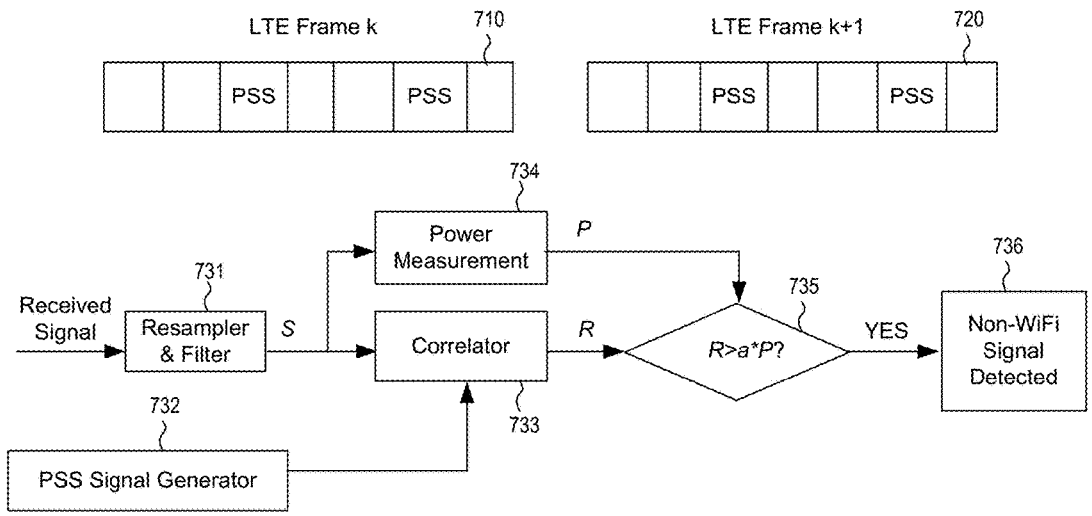
FIG. 7 illustrates one example of radio signal detection based on LTE signal features.

FIG. 7 illustrates one example of radio signal detection based on LTE signal features. In LTE and LTE Advanced systems, Primary Synchronization Signal (PSS) and Secondary Synchronization Signal (SSS) are the signals for synchronization. They are broadcasted periodically in all directions in the cell, for example, PSS is transmitted twice in each LTE frame, as depicted by frame k 710 and frame (k+1) 720. FIG. 7 is one embodiment of using PSS for Non-WiFi signal detection. First, an STA filters and re-samples the received signal to match the LTE transmissions via re-sampler and filter 731 and outputs the processed signal S. The STA then correlates the processed signal S with the self-generated PSS generated by PSS signal generator 732. The correlator 733 outputs correlation results R. The power measurement circuit 734 measures the processed signal S and outputs measured power P. By comparing the correlation results R with the measured power P via comparator 735, e.g., checking R>α*P, an LTE signal can be detected by signal detector 736 and claimed as non-WiFi signal.

Figure 8:
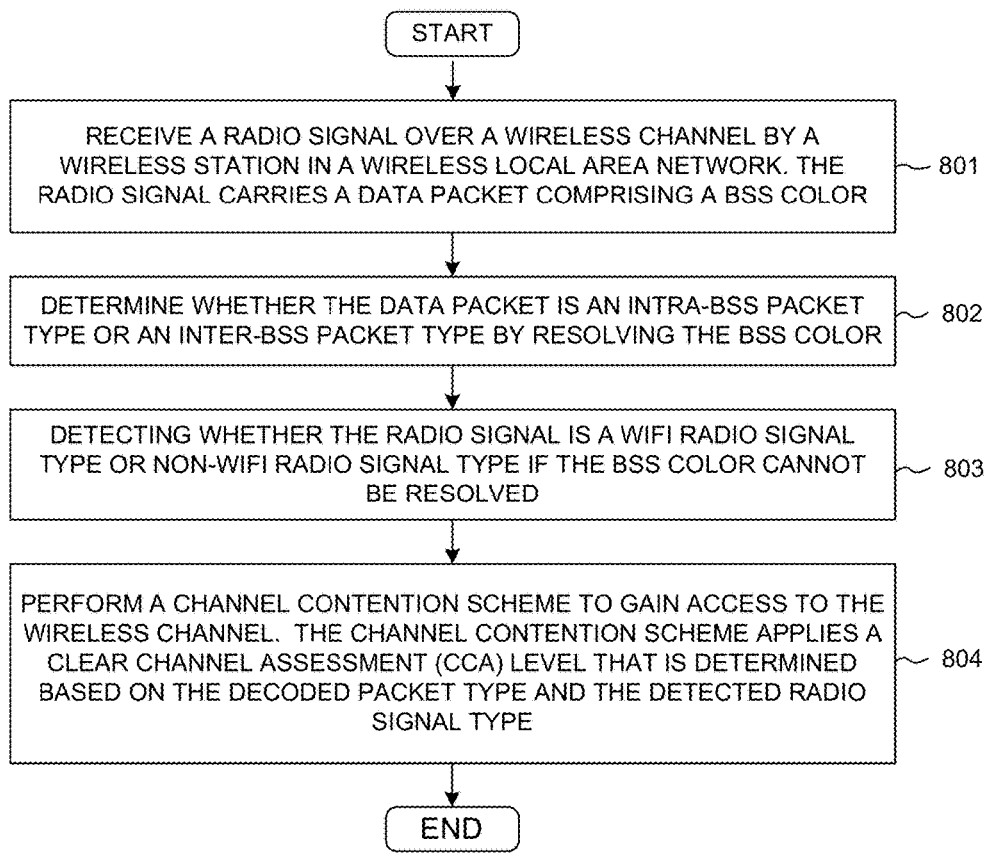
FIG. 8 is flow chart of a method of performing an enhanced channel contention scheme in accordance with a novel aspect.

FIG. 8 is flow chart of a method of performing an enhanced channel contention scheme in accordance with a novel aspect. In step 801, a wireless station receives a radio signal over a wireless channel in a wireless local area network (WLAN). The radio signal carries a data packet. In step 802, the wireless station determines whether the data packet has an intra-BSS packet type or an inter-BSS packet type by resolving a BSS color of the data packet. In step 803, the wireless station detects whether the radio signal has a WiFi radio signal type or a non-WiFi signal type if the BSS color cannot be resolved. In step 804, the wireless station performs a channel contention scheme to gain access to the wireless channel. The channel contention scheme applies a clear channel assessment (CAA) level that is determined based on the decoded packet type and the detected radio signal type.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a radio signal over a wireless channel by a wireless station in a wireless local area network, wherein the radio signal carries a data packet;
   determining whether the data packet has an intra-basic service set (BSS) packet type or an inter-BSS packet type by resolving a BSS color of the data packet;
   detecting whether the radio signal has a WiFi radio signal type or a non-WiFi radio signal type if the BSS color cannot be resolved; and
   performing a channel contention scheme to gain access to the wireless channel, wherein the channel contention scheme applies a clear channel assessment (CCA) level that is determined based on the decoded packet type and the detected radio signal type.

2. The method of claim 1, wherein the wireless station does not contend for channel access if the data packet type is intra-BSS.

3. The method of claim 1, wherein the wireless station applies a first CCA level if the data packet type is inter-BSS.

4. The method of claim 1, wherein the wireless station applies a second CCA level if the radio signal is a WiFi signal but the BSS color cannot be resolved.

5. The method of claim 1, wherein the wireless station applies a third CCA level if the radio signal is a non-WiFi signal.

6. The method of claim 1, wherein the BSS color is indicative of a BSS identifier (ID), and wherein the BSS color is a subfield contained in a signal field of the data packet.

7. The method of claim 1, wherein the wireless station detects the radio signal type based on WiFi signal features.

8. The method of claim 7, wherein the wireless station performs auto-correlation of the radio signal with an orthogonal frequency division multiplexing (OFDM) modulated WiFi signal having a predefined OFDM symbol length and a predefined cyclic prefix (CP) length.

9. The method of claim 1, wherein the wireless station detects the radio signal type based on LTE signal features.

10. The method of claim 9, wherein the wireless station performs auto-correlation of the radio signal with a predefined primary synchronization signal (PSS).

11. A wireless station, comprising:
- a radio frequency (RF) receiver that receives a radio signal over a wireless channel in a wireless local area network, wherein the radio signal carries a data packet;
- a decoder that decodes the data packet and determines whether the data packet has an intra-basic service set (BSS) packet type or an inter-BSS packet type by resolving a BSS color of the data packet;
- a radio signal detecting circuit that detects whether the radio signal has a WiFi radio signal type or a non-WiFi radio signal type if the BSS color cannot be resolved; and
- a channel access handling circuit that performs a channel contention scheme to gain access to the wireless channel, wherein the channel contention scheme applies a clear channel assessment (CCA) level that is determined based on the decoded packet type and the detected radio signal type.

12. The wireless station of claim 11, wherein the wireless station does not contend for channel access if the data packet type is intra-BSS.

13. The wireless station of claim 11, wherein the wireless station applies a first CCA level if the data packet type is inter-BSS.

14. The wireless station of claim 11, wherein the wireless station applies a second CCA level if the radio signal is a WiFi signal but the BSS color cannot be resolved.

15. The wireless station of claim 11, wherein the wireless station applies a third CCA level if the radio signal is a non-WiFi signal.

16. The wireless station of claim 11, wherein the BSS color is indicative of a BSS identifier (ID), and wherein the BSS color is a subfield contained in a signal field of the data packet.

17. The wireless station of claim 11, wherein the wireless station detects the radio signal type based on WiFi signal features.

18. The wireless station of claim 17, wherein the wireless station performs auto-correlation of the radio signal with an orthogonal frequency division multiplexing (OFDM) modulated WiFi signal having a predefined OFDM symbol length and a predefined cyclic prefix (CP) length.

19. The wireless station of claim 11, wherein the wireless station detects the radio signal type based on LTE signal features.

20. The wireless station of claim 19, wherein the wireless station performs auto-correlation of the radio signal with a predefined primary synchronization signal (PSS).

* * * * *